United States Patent [19]

Takeda

[11] 4,106,670
[45] Aug. 15, 1978

[54] PRESETTABLE METERING VALVE

[76] Inventor: Yoshiaki Takeda, Yotsuya 3-64-27, Fuchu-shi, Tokyo-to, Japan

[21] Appl. No.: 644,051

[22] Filed: Dec. 24, 1975

[30] Foreign Application Priority Data

Dec. 24, 1974 [JP] Japan ................................. 49-1704

[51] Int. Cl.² ........................................... F16K 21/16
[52] U.S. Cl. ................................. 222/20; 137/624.11
[58] Field of Search ............... 222/20, 17; 137/624.11, 137/624.17

[56] References Cited

U.S. PATENT DOCUMENTS 2,929,534  3/1960  Trubert .................................. 222/20
3,473,695  10/1969  Anesi ..................................... 222/20

Primary Examiner—Robert B. Reeves
Assistant Examiner—Frederick R. Handren
Attorney, Agent, or Firm—Otto John Munz

[57] ABSTRACT

A trigger valve which closes a main valve after a predetermined volume of fluid passes therethrough is equipped with a conversion mechanism arranged in the flow path of the fluid and functioning to translate the amount of fluid flowing through into a proportional amount of motion. A cam mechanism is turned by the conversion mechanism. The trigger valve closes the valve disk automatically due to the function of the cam mechanism when the fluid has flowed in a pre-determined quantity. Examples demonstrate the ability to control the valve means to increase or decrease a predetermined standard flow of fluid at will by manipulations of a control mechanism.

7 Claims, 14 Drawing Figures

PRESETTABLE METERING VALVE

BACKGROUND OF THE INVENTION

1. Field of the invention:

The present invention relates to a valve means and, more particularly, to a pilot operated valve means so adapted as to close a valve disk when a certain amount of water or fluid has flowed out after said valve disk is opened at the starting time.

2. Description of the prior art:

Conventionally, there were used valve means equipped with a combination of a solenoid valve and a timer which functions to actuate the solenoid valve to close a valve disk when a certain time has elapsed after opening the valve disk, for example, to automatically fill a bath tub with a required amount of water. However, such valve means equipped with a combination of a solenoid valve and a timer are unavoidably large-scale units and require high manufacturing cost. In addition, such valve means have a drawback that a timer can not detect varations in the flow rate and it is impossible to fill a bath tub precisely with the required amount of water if the flow rate is changed due to variation in water pressure.

SUMMARY OF THE INVENTION

It is, therefore, a general object of the present invention is to provide a valve means which is equipped with valve disk, a conversion mechanism arranged partially in a flow path and serving for converting amount of fluid having flowed through the flow path into proportional amount of motion and a cam moved by said conversion mechanism, and which is so adapted as to close the valve disk when a pre-determined amount of fluid has flowed through the flow path.

DETAILED DESCRIPTION OF THE PREFERRED EMBODIMENTS

Figure 1:
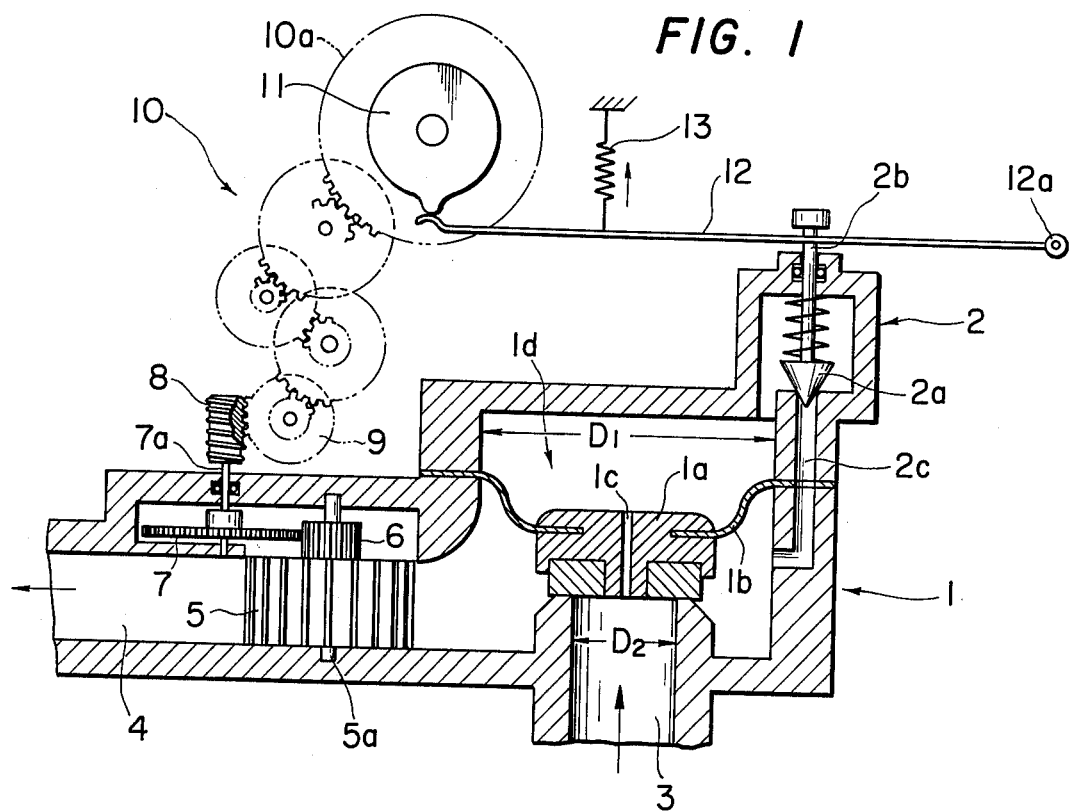
FIG. 1 shows a sectional view illustrating the construction of the valve means according to the present invention.

Now, some preferred embodiments of the present invention will be described with reference to the attached drawings illustrating the details of the valve means. In FIG. 1, there are shown a main valve 1 having a diaphragm 1b to which a valve disk 1a is attached. A trigger valve 2a constructed to open and close the valve disk is mounted on a valve shaft 2b. The upper side of the trigger valve communicates with the upper side of the diaphragm 1b of the main valve, and the lower side of the trigger valve communicates with the lower side of the diaphragm. The main valve is therefore closed while the trigger valve is kept closed, and is opened while the trigger valve is kept open. An inlet-port 3 is communicated, for example, with a water supply faucet so that water flows into the valve means when the valve disk is opened. An outlet port 4 is connected to a location requiring water and functions to flow water from the inlet port to said location. A water wheel 5 is shown rotatably arranged in the vicinity of the outlet port in the illustrated embodiment but it may be arranged in any position of the flow path, for example in the vicinity of the inlet port. A first gear 6 is fixed to the shaft 5a of the water wheel 5, and is mounted in engagement with a second gear. A worm 8 is fixed to the shaft 7a of the second gear. A third gear 9 is engaged with the worm 8 and is connected further to a reduction gear means 10. A cam 11 is coaxially fixed to a gear 10a at the last stage of the reduction gears 10, and an actuator 12 is arranged rotatably around a fulcrum shaft 12a and is attached to the tip of the valve shaft 2b of the trigger valve 2. The tip of the actuator 12 is kept in contact with the circumference of the cam 11. A spring 13 always functions to raise the actuator 12 in the direction indicated by the arrow to keep the tip of the actuator 12 in contact with the cam circumference.

THE OPERATION OF THE VALVE MEANS OF THE ABOVE MENTIONED CONSTRUCTION

The trigger valve controls the opening and closing of the main valve. In the state shown in FIG. 1, the trigger valve 2 is closed. Therefore, water from the inlet port 3 flows into the space 1d in the main valve 1 through the hole 1c formed in the valve disk 1a and the pressure in the space 1d is balanced with the pressure in the inlet port 3. As the diameter $D_1$ is larger than the diameter $D_2$, the main valve 1 is kept closed. When the cam 11 is turned from the position shown in FIG. 1 to another position, the tip of the actuator 12 moves from the highest portion to a low portion on circumference of the cam 11. Since the tip of the actuator 12 rises at this stage, the valve shaft 2b of the trigger valve 2 is pulled upward to open the valve 2a which was kept closed before this stage. When the trigger valve 2 opens, water in the space 1d flows out through the passage 2c to the outlet port 4. As the diameter of the passage 2c is larger than the diameter of the hole 1c, the flow rate of water which flows out from the space 1d to the outlet port 4 through the passage 2c is larger than the flow rate of water which flows into the space 1d through the hole 1c. Therefore, the pressure in the space 1d decreases and the main valve 1 is opened. When the main valve 1 is opened, water flows into the flow path through the inlet port 3 and flows out through the outlet port 4. In this condition, the water wheel 5 is rotated by the water stream flowing out of the outlet port 4. The rotation of the water wheel 5 is transmitted through the reduction gear means to rotate the cam 11. When the cam 11 is rotated until the tip of the actuator 12 reaches the highest portion of the circumference of the cam again, the tip of the actuator 12 and the valve shaft 2b of the trigger valve 2 are pushed downward to close the valve 2a. When the trigger valve 2 is closed, the pressure in the space 1d is increased by water which flows into it through the hole 1c. Consequently, the main valve 1 is also closed to stop the water flow.

Since the quantity of water which has flowed out during a series of operations described above is proportional to the number of rotations of the water wheel 5, the rotating angle of the cam 11 is also proportional to the quantity of water having flowed out. Thus, it is possible to automatically stop the water flow after the cam is rotated at a pre-determined angle and a required amount of water has flowed out when the interrelation between the rotating angle of the cam 11 and quantity of water having flowed out is preliminarily known.

A MECHANISM FOR CONTROLLING THE QUANTITY OF WATER TO BE FLOWED

Figure 3:
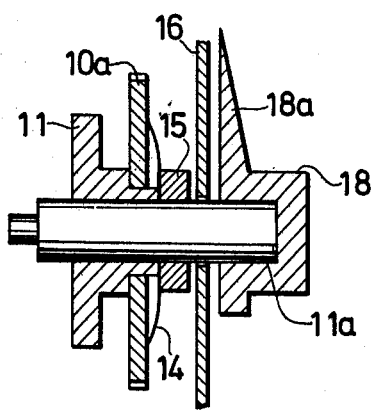
FIG. 3 shows a sectional view of the flow control mechanism shown in FIG. 2.

In FIG. 3 the cam 11 is shown fixed to the shaft 11a. A gear 10a is rotatably attached to the shaft 11a and is arranged at the last stage of the reduction gear. A washer 14 with a clamp 15 is provided to serve as a spring for pressing the gear 10a to the cam 11. A panel 16 is provided with an indication scale 17 and a knob 18 equipped with a pointer 18a is fixed to the end of the shaft 11a. The assembly of the parts is shown on FIG. 3.

When the knob 18 is turned on the control mechanism of the construction described above, the gear 10a is engaged with the other gears and can not be turned, but the cam 11 can be rotated since it is rotatable against the friction of the washer 14 which presses the gear 10a to the cam 11. Therefore, the highest portion of the cam 11 detaches from the tip of the actuator 12 by turning the knob 18. Since the rotating angle of the cam 11 is proportional to the quantity of water having flowed out of the flow path, it is possible to preliminarily set the cam to automatically flow a required quantity of water when the indication scale on the panel 16 is so graduated as to represent quantities of water corresponding to rotating angles of the cam 11.

A CONTROL MECHANISM FOR THE VALVE MEANS OF FIGURE 4

Figure 4:
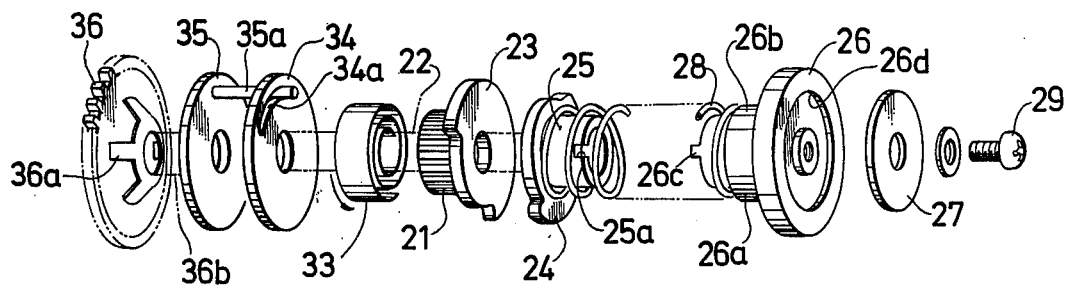
FIG. 4 illustrates a perspective view of another embodiment of the flow control mechanism according to the present invention.

In FIG. 4 there are shown: a pinion 21, fixed to a shaft 22;

a cam 23 fixed to the shaft 22 and having a shape as shown on FIGS. 6A through 8C;

a slide cam 24 which has the same shape as the cam 23 but is rotatably attached to the shaft 22 and an annular member 25 having a notch 25a which is formed integrally with the slide cam 24 or separately from the slide cam 24 but assembled with it so that it is rotatable with the slide cam 24. A setting dial is provided which is rotatably attached to the shaft 22. On the side of the setting dial facing the slide cam, and associated parts, there are formed steps 26a and 26b, and a protrusion 26c fitting into the notch 25a of the annular member 25. A scale dial 27 fits into the cavity 26d formed in the setting dial 26 and a spring 28 is mounted on the outer circumference of the annular member 25 formed integrally with the slide cam 24 and on the outer circumference of the step 26b of the setting dial 26. The parts described above are assembled and fixed with a screw 29 in such a condition that the spring 28 is compressed and the protrusion 26c of the setting dial 26 is fitted into the notch 25a of the annular member 25.

THE CONTROL MECHANISM OF FIGURE 5

Figure 9:
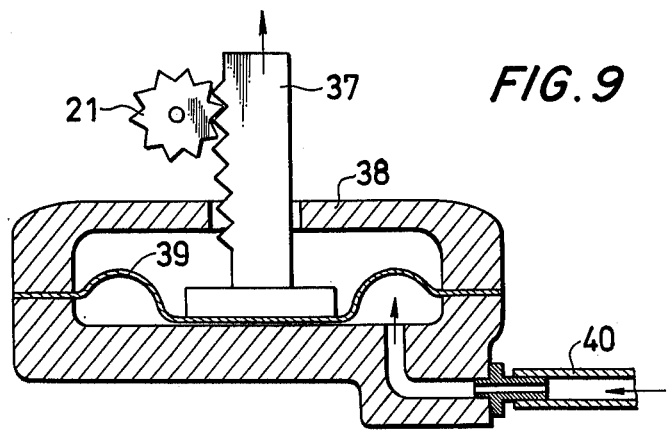
FIG. 9 shows another embodiment of a control mechanism for the valve means according to the present invention. Same numerals denote same or equivalent parts in the various embodiments.
Figure 7A:
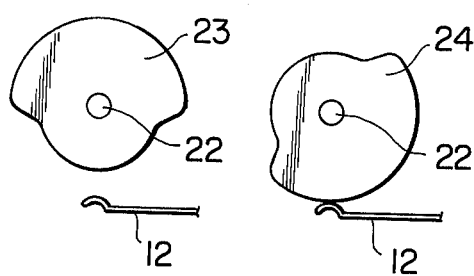

A control lever 30 attached rotatably around a shaft 31 and equipped at its tip with teeth 30a to be engaged with the pinion 21; a stopper 32 which serves to prevent the control lever 30 from being pushed downward below a certain lower limit. A spring 33 shown on FIG. 4 functions to softly turn the shaft 22 in the direction indicated by the arrow. A first disc 34 is fixed to the shaft 22 and has a slot 34a. A second disc 35 is equipped with a pin 35a which is inserted into the slot 34a of the first disc 34, both the discs being so assembled as to form a pin joint. A gear 36 is provided corresponding to the last stage gear 10a of the reduction gear means 10 shown on FIG. 1. The gear 36 is loosely fitted over a shaft 36b and is fixed under the pressure applied by washer 36a. When the control lever 30 is first pushed downward from the illustrated position until it is stopped by the stopper 32, the toothed portion of its tip is raised to rotate the pinion 21 together with the fixed cam 23 and the slide cam 24. Since the first disc 34 rotates with the rotation of the pinion 21, the second disc is also rotated by the slot 34a and pin 35a, but the gear 36 is kept stationary due to the load applied to it. The shaft 22, the cam 23 fixed to said shaft and the slide cam 24 are thereafter rotated within the range of the slot 34a formed in the first disc 34. Since this rotation causes the actuator which is in contact with the surfaces of these cams to open the trigger valve 2 as described subsequently, the main valve 1 is also opened to flow water through the flow path. This water flow turns the water wheel 5 so as to rotate the gear 36 through the reduction gear means as already described. This rotation of the gear 36 causes rotation of the fixed cam 23 and slide cam 24 and, after a required quantity of water has flowed out as described with reference to FIG. 1, both the trigger valve 2 and the main valve 1 are closed to stop the water flow. The transmission mechanism comprising the abovementioned disks 34 and 35 is provided due to the following reason. When the transmission mechanism comprising the disks 34 and 35 is not provided, it is necessary to position the cams so that water flows out immediately when the control lever 30 is pushed down to the stopper 32. If, in that case, the control lever is kept pushed down for a long time, water is kept flowing out during that time and, consequently, the total amount of water which flows out becomes different from the pre-determined amount. On the other hand, when the transmission mechanism is provided, water does not flow out during the time when the control lever 30 is kept pushed down even if it is kept pushed down for a long time and, therefore, the total amount of water which flows out becomes constant. This fact is very important especially when the control mechanism shown in FIG. 9 is used.

THE FUNCTIONS OF THE FIXED CAM 23, THE SLIDE CAM 24 AND RELATED PARTS USED FOR CONTROLLING WATER QUANTITY IN THE CONTROL MECHANISM

Figure 6A:
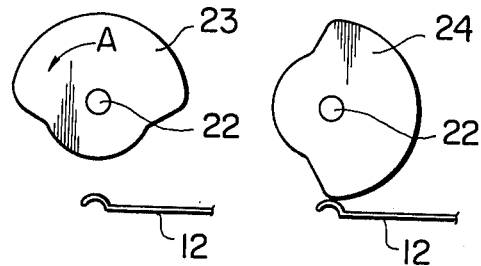
FIGS. 6A, 6B, 7A, 7B, 7C, 8A, 8B and 8C show schematic representations illustrating relative positional relationship between the cam and a valve actuator.
Figure 6B:
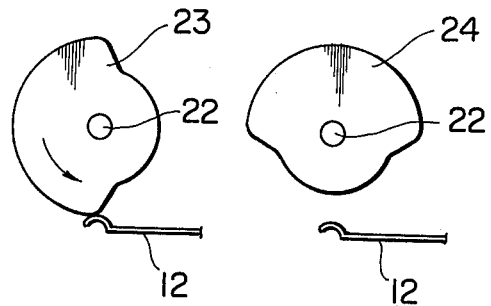
Figure 2:
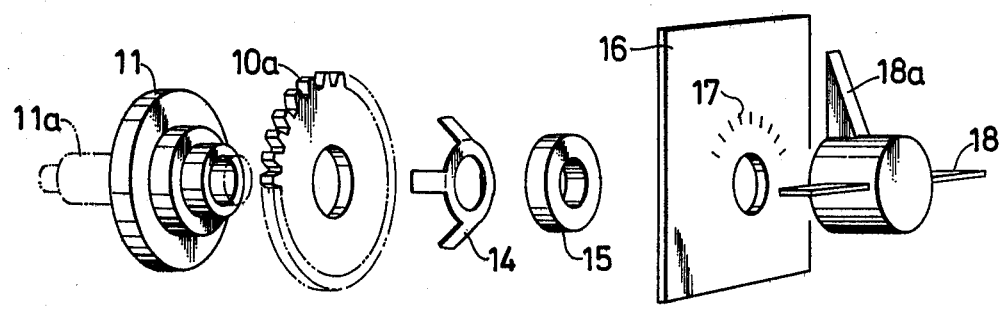
FIG. 2 shows an exploded perspective view of the flow control mechanism of the valve means shown in FIG. 1.

FIG. 6A, 6B, 7A, 7B, 7C, 8A, 8B and 8C illustrate shapes of the fixed cam 23 and the slide cam 24 as well as relative positional relationship between said cams. Though these drawings illustrate the cams in separate front elevations, the cams are actually arranged in mutual contact with each other on the shaft 22 as shown in FIG. 4. FIG. 6A through FIG. 8C show the actuator 12 for each of the cams for illustrating positional relationship between the tip of the actuator 12 and each cam while the shaft 22 turns and, hence, the fixed cam 23 rotates together with the slide cam 24. In reality, however, the actuator 12 is common to both the cams and is positioned on the circumferences of both the cams which are arranged in mutual contact with each other so as to rotate together. FIG. 6A and FIG. 6B illustrate an arrangement for setting the cams so as to close the valve disks after 100l, for example, of water has flowed out. This quantity of water will be used as the standard for the subsequent descriptions. FIGS. 6A, 6B; 7A, 7B, 7C; 8A, 8B and 8C illustrate typical positions of the cams while they are changing their positions during their rotations, taking the positions shown in FIGS. 6A, 7A and 8A as the standards respectively for the subsequent descriptions.

THE FUNCTIONS OF THE CAMS

Let us assume that the fixed cam 23 and slide cam 24 are arranged with a phase difference of 90° for flowing the standard quantity of water specified with reference to FIG. 6A and FIG. 6B. At the standard positions shown in FIG. 6A, the tip of the actuator 12 is pushed downward by the slide cam 24 to close the trigger valve 2 as shown in FIG. 1 and, therefore, the main valve 1 is also closed and the valve means is kept at its stop position. When the control lever 30 is pushed or turned downward by an angle of $\theta$ until it is brought in contact with the stopper 32, the fixed cam 23 and the slide cam 24, with the associated parts are turned through pinion 21. When the rotating direction and angle for the cams shown in FIG. 6A are preliminarily so determined, for example, as to turn the cams 90° counterclockwise, both the cams are set in the positions illustrated in FIG. 6B. When the tip of the actuator 12 passes over the low portions of both the cam circumferences and reaches the highest portion on the circumference of the fixed cam 23, the tip of the actuator 12 is pushed down again and the trigger valve 2 is closed in its initial condition. When the control lever 30 is released the spring 33 functions to return the shaft 22a little in the direction reverse to that of the rotation caused by the control lever 30 and the tip of the actuator 12 displaces in a moment from the highest portion to the low portion on the circumference of the fixed cam 23. The tip of the actuator 12 is therefore raised by the force of the spring 13 and both the trigger valve 2 and the main valve 1 are opened to start flowing water. The water wheel 5 is thereby turned and both the cams are rotated through the reduction gear means 11. When the shaft 22 is so arranged as to turn clockwise at this stage, it rotates in the direction reverse to that of the rotation caused by the control lever 30 and sets the cams in the conditions illustrated in FIG. 6A. Since the tip of the actuator 12 is located in this condition on the highest portion on the circumference of the slide cam 24, the tip of the actuator 12 is pushed down and both the trigger valve 2 and the main valve 1 are closed to stop the water flow. The water wheel and the gears are stopped correspondingly to stop the fixed cam 23 and the slide cam 24. Since the pinion 21 which is fixed to the shaft 22 also rotates during the rotations of both the cams, the control lever is gradually raised to restore its initial condition.

AN EXAMPLE FOR SETTING THE CONTROL MECHANISM FOR A FLOW OF WATER IN A QUANTITY SMALLER THAN THE STANDARD QUANTITY

For setting the control mechanism so as to flow water in a quantity smaller than the standard quantity, for example, so as to flow 50l of water when the standard water quantity is designed at 100l, the setting dial 26 shown in FIG. 4 is turned clockwise and set at a graduation of 50l. While the setting dial is turned in this way, the annular member 25 is rotated and the slide cam 24 which is integrally assembled with said annular member is also rotated. However, the shaft 22, fixed cam 23, etc. are kept in unrotatable conditions and, therefore, only the slide cam 24 and the annular member 25 are rotated together with the setting dial 26. After the setting dial is turned as described above, the fixed cam 23 and the slide cam 24 are set in the positional relationship illustrated in FIG. 7A. When the control lever 30 is pushed down to the height of the stopper 32 as already described after both the cams are set in the above-mentioned positions, both the cams are rotated until they reach the conditions illustrated in FIG. 7C. After this stage, water is flowed and both the cams gradually rotate with the functions already described. In this example, however, the tip of the actuator reaches the highest portion on the circumference of the slide cam 24 when both cams rotate approximately 45° and are set in the conditions illustrated in FIG. 7B. At this stage, both the trigger valve 2 and the main valve 1 are closed to stop the water flow and both the cams stop rotating consequently. That is to say, the water flow is stopped when water has flowed out only in an amount equal to half the quantity in the preceding example. It will be needless to say that the control lever 30 is turned by an angle equal to half that in the preceding example and set at a position $\theta/2$ deviated from the illustrated position.

AN EXAMPLE FOR SETTING THE VALVE MEANS FOR A FLOW OF WATER IN AN AMOUNT LARGER THAN THE STANDARD QUANTITY

Figure 8A:
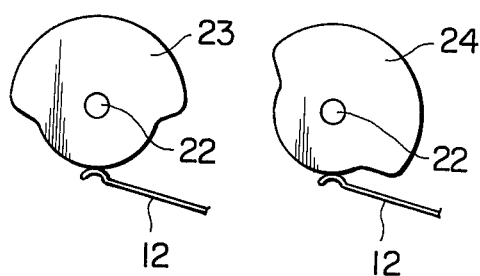
Figure 7B:
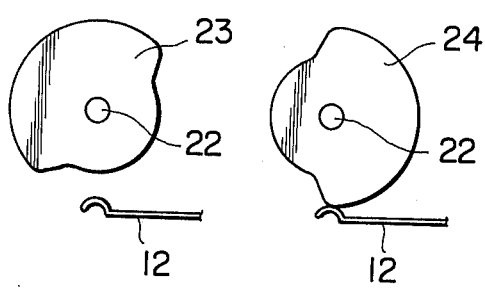
Figure 8B:
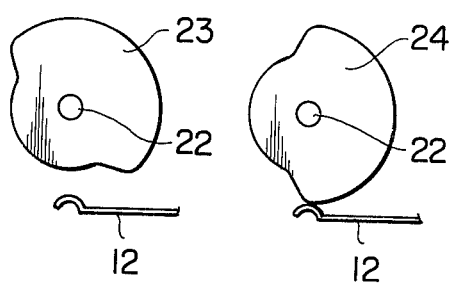
Figure 7C:
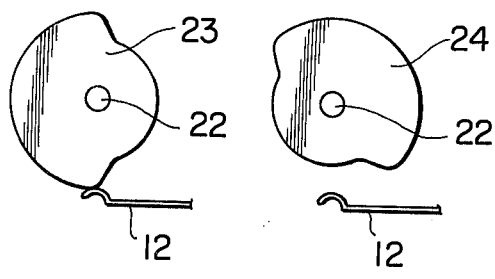
Figure 8C:
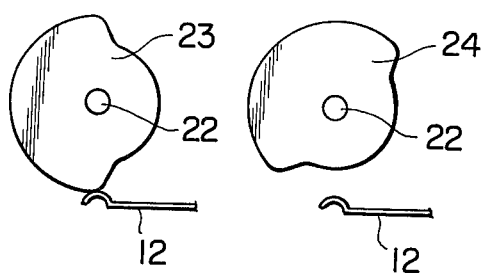

In this case, the setting dial 26 is turned counterclockwise (in the direction reverse to that described in the preceding example) to change the positional relationship between the fixed cam 23 and slide cam 24 and set them in the positions illustrated in FIG. 8A. Since the tip of the actuator 12 is located at this stage on low portions on the circumferences of both the fixed cam 23 and the slide cam 24, the trigger valve 2 and the main valve 1 are opened, and water flows immediately to turn both the cams. When both the cams reach the conditions shown in FIG. 8B, the tip of the actuator is brought in contact with the highest portion on the circumference of the slide cam 24 to stop the water flow. In this last example, the setting dial turns from its set position to its stop position by an angle equal only to half that shown in FIG. 6A and FIG. 6B and, therefore, water is flowed out only in 50l. In this example, the control lever, however, continues rising when it reaches its original stop position in the first example and stops at a position $\theta/2$ higher. By pushing the control lever 30 down to the height of the stopper 32 in this step, the control lever turns $\theta + \theta/2 = 3\theta/2$. By turning the control lever 30 as described above, both the cams turns from the positions illustrated in FIG. 8B to those shown in FIG. 8C, whereafter water flows out and both the cams continue rotating as already described with reference to FIG. 6A and FIG. 6B illustrating the functions to flow water in the standard quantity. Then the cams rotate from the positions shown in FIG. 8C to those shown in FIG. 8A, until they reach the positions illustrated in FIG. 8B. Since the highest portion on the circumference of the slide cam 24 pushes down the tip of the actuator 12 in this condition, both the trigger valve 2 and the main valve 1 are closed to stop the water flow. As is clearly understood from the figures, the cams rotate approximately 135° during this while, which is equal to 1.5 times the rotating angle of approximately 90° of both the cams illustrated in FIG. 6A and FIG. 6B for setting the valve means so as to flow water in the standard quantity of 100l. The control mechanism therefore functions to allow the valve means according to the present invention to flow 150l of water in this example.

EXAMPLE OF OPERATING MEANS REMOTELY CONTROLLED BY WATER PRESSURE

Figure 5:
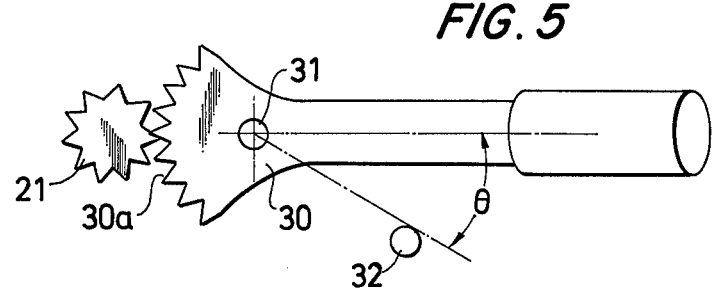
FIG. 5 illustrates a sectional view of an embodiment of a control mechanism.

In FIG. 9 there are shown the pinion 21, a rack 37 engaged with the pinion 21, a cylinder 38, a diaphragm 39 arranged in the cylinder, a pipe 40 for applying water pressure. When water pressure is applied through the pipe 40, the diaphragm 39 is pushed up and the rack 37 is also raised up, whereby the pinion 21 is rotated. This system utilizing water pressure performs the same function as the control lever 30 illustrated in FIG. 5. When the control mechanism is so constructed as to set to its highest position under the water pressure by raising the rack 37 in the relationship of the cams and related parts the same as that established by pushing down the control lever 30 to the height of the stopper 32, and the function of the control mechanism remains the same.

Since the valve means is so constructed as to close the valve disk when a predetermined quantity of fluid has flowed out, it permits control accurately of the quantity of fluid to be flowed out and is free from the drawback of the conventional valve means using timers which control quantity of fluid as a function of time and can not assure constant outflow volume when fluid pressure varies. Further, the valve means according to the present invention can be manufactured at a cost lower than the conventional valve means.

When the valve means according to the present invention is equipped with the control mechanism illustrated in FIG. 4, it is possible to flow out water always in a constant quantity simply by setting the control knob at a certain graduation on the indication dial and to remotely control the valve means.

Although the above examples are equipped with the main valve which is operated by opening and closing the trigger valve 2, it is within the scope of the invention to construct the main valve so that it may be opened and closed directly. Furthermore, the present invention is not limited to an arrangement by which the cams are rotated by the water wheel but is applicable to different modes in which various shapes of cams are rotated by using different mechanisms, for example, with a piston arranged in the flow path for converting the flow in the flow path into a rotating or linear motion, whereby the valve disk is closed when the cams are rotated at a pre-determined angle.

I claim:

1. A valve which closes after a predetermined volume of fluid passes therethrough comprising:
   means forming a flow path for the fluid;
   a main valve controlling flow through said flow path
   a trigger valve in communication with said main valve;
   a conversion mechanism arranged in the flow path of said fluid with means to translate the amount of fluid flowing through said flow path into proportional amount of motion and
   a cam mechanism comprising:
   a cam shaft driven by said conversion mechanism;
   a first cam having a high portion and low portion fixed to said cam shaft;
   a second cam slidably mounted to said cam shaft and having a high portion and low portion;
   said second cam being angularly adjustable on said cam shaft with respect to said first cam;
   said trigger valve being equipped with a valve stem; and
   an actuator fixed to the valve stem of said trigger valve and having one end biased against cam surfaces of both of said first and second cams;
   setting means for moving said cam shaft and said cams to a first position prior to commencement of fluid flow and biasing means responsive to release of said setting means for moving said cam shaft and said cams from said first position to a second position at which flow commences.

2. A valve as claimed in claim 1, further comprising: a pointer rotatable with said second cam and a scale dial having graduations calibrated to indicate the relative angular positions of the cams and the amount of fluid to be flowed.

3. A valve as claimed in claim 1, further comprising:
   a transmission mechanism connecting said conversion mechanism and cam mechanism and arranged to rotate said cam mechanism simultaneously with said conversion mechanism after said cam shaft and cams of said cam mechanism reach said second position.

4. A valve as claimed in claim 3, said transmission mechanism comprising:
   a spring constituting said biasing means;
   a first disk fixed to said cam shaft, and
   a second disk to be rotated by said conversion mechanism;
   said first and second disks being connected to each other by a pin fixed to one of said disks and a slot formed in the other disk.

5. A valve according to claim 4 wherein said setting means comprises:
   a pinion fixed to said cam shaft, and
   a control lever having teeth meshing with said pinion.

6. A valve as claimed in claim 4 wherein said setting means comprises:
   a pinion fixed to said cam shaft, and
   a rack meshing with said pinion and arranged to rotate said cam shaft by a pre-determined angle through said pinion by movements of said rack by fluid pressure.

7. A valve as claimed in claim 4 wherein said setting means comprises:
   a pinion fixed to said cam shaft;
   a rack meshing with said pinion;
   a casing movably supporting said rack;
   a diaphragm arranged in said casing;
   said valve means being equipped to move said rack through said diaphragm by pushing up said diaphragm by fluid pressure and to rotate said cam shaft by a predetermined angle by rotating said pinion by the movement of said rack.

* * * * *